United States Patent
Otero et al.

(10) Patent No.: US 9,321,520 B2
(45) Date of Patent: Apr. 26, 2016

(54) DRAINAGE MAST OF THE COMPARTMENT OF THE AUXILIARY POWER UNIT OF AN AIRCRAFT

(75) Inventors: Jose Grana Otero, Madrid (ES); Ignacio Esteban Parra Fabian, Madrid (ES); Carlos Casado Montero, Madrid (ES)

(73) Assignee: Airbus Operations S.L., Madrid (ES)

( * ) Notice: Subject to any disclaimer, the term of this patent is extended or adjusted under 35 U.S.C. 154(b) by 15 days.

(21) Appl. No.: 13/453,239

(22) Filed: Apr. 23, 2012

(65) Prior Publication Data

US 2013/0193271 A1   Aug. 1, 2013

(30) Foreign Application Priority Data

Jan. 26, 2012   (EP) .................................... 12382027

(51) Int. Cl.
  *B64D 1/00*   (2006.01)
  *B64C 1/14*   (2006.01)
  *B64D 41/00*   (2006.01)
(52) U.S. Cl.
  CPC .......... *B64C 1/1453* (2013.01); *B64D 2041/002* (2013.01)
(58) Field of Classification Search
  CPC .................................................... B64C 1/1453
  USPC ................................................... 244/136, 58
  See application file for complete search history.

(56) References Cited

U.S. PATENT DOCUMENTS

| | | | | |
|---|---|---|---|---|
| 3,777,978 A * | 12/1973 | Manicatide et al. | ........... | 239/171 |
| 4,364,517 A * | 12/1982 | Etheridge et al. | ............. | 239/171 |
| 4,411,399 A * | 10/1983 | Hapke | ............................ | 244/130 |
| 5,290,996 A * | 3/1994 | Giamati et al. | ................ | 219/201 |
| 5,655,732 A * | 8/1997 | Frank | ............................... | 244/1 R |
| 5,996,938 A | 12/1999 | Simonetti | | |
| 6,211,494 B1 * | 4/2001 | Giamati et al. | ................ | 219/482 |
| 7,677,500 B2 * | 3/2010 | Redecker | ....................... | 244/136 |
| 8,371,522 B2 * | 2/2013 | Piesker | ........................... | 244/58 |
| 2006/0249628 A1 | 11/2006 | Turner et al. | | |
| 2006/0273224 A1 * | 12/2006 | Hoffjann et al. | .............. | 244/136 |

FOREIGN PATENT DOCUMENTS

EP   0 439 923 A1   8/1991
EP   0 940 338 A2   9/1999

OTHER PUBLICATIONS

European Search Report issued Jun. 8, 2012 in Patent Application No. 12 38 2027.

* cited by examiner

*Primary Examiner* — Christopher P Ellis
*Assistant Examiner* — Jessica Wong
(74) *Attorney, Agent, or Firm* — Nixon & Vanderhye P.C.

(57) ABSTRACT

A drainage mast for draining liquids from an APU compartment of an aircraft with a first end connected to the APU compartment and a second end for discharging the liquids to the atmosphere. The drainage mast is configured with at least a sector having decreasing cross section areas towards the second end. The area of the initial cross section of the sector is lesser than the area of any cross section of the drainage mast closer to the first end. The invention also refers to an aircraft comprising the drainage mast.

16 Claims, 3 Drawing Sheets

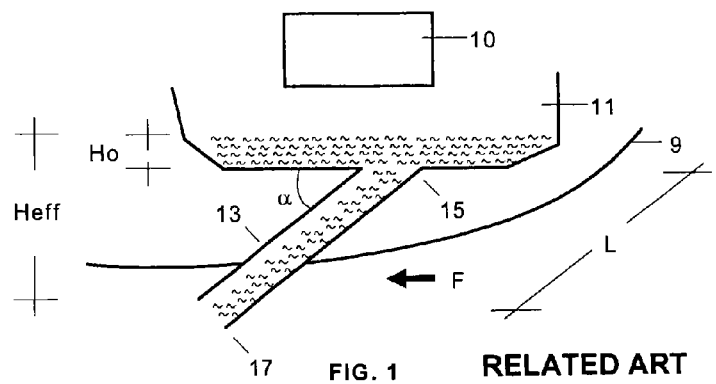
FIG. 1 RELATED ART
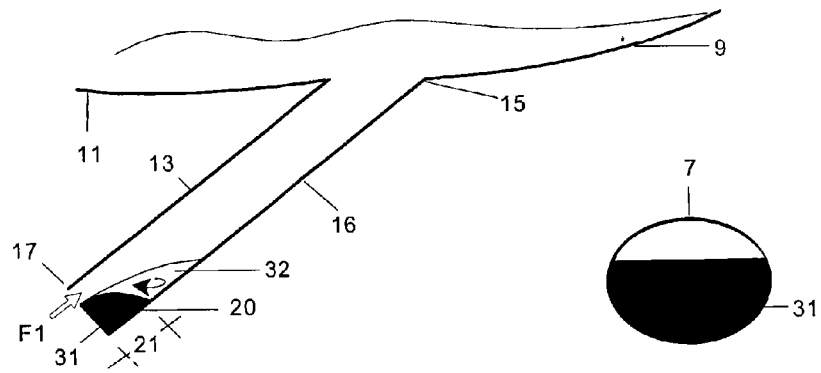
FIG. 2
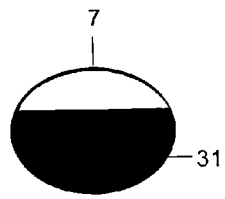
FIG. 2a
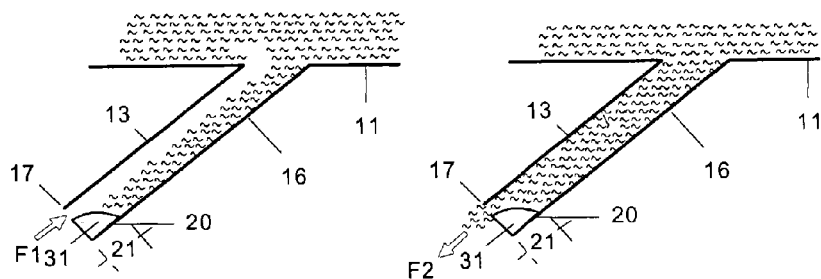
FIG. 3a
FIG. 3b

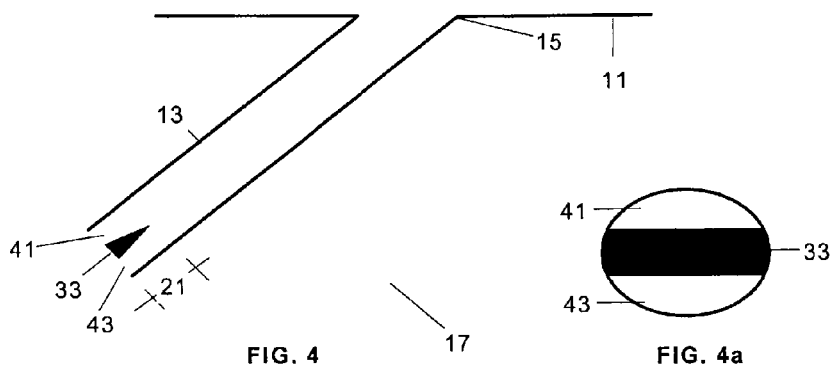
FIG. 4          FIG. 4a
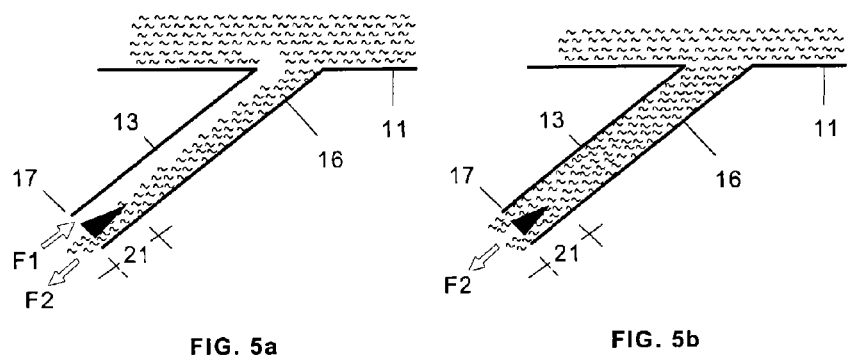
FIG. 5a          FIG. 5b
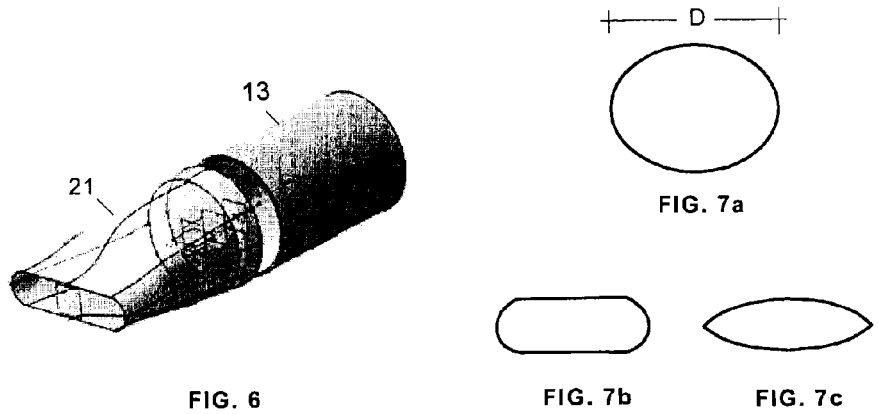
FIG. 6          FIG. 7a
FIG. 7b          FIG. 7c

DRAINAGE MAST OF THE COMPARTMENT OF THE AUXILIARY POWER UNIT OF AN AIRCRAFT

FIELD OF THE INVENTION

The present invention relates to the Auxiliary Power Unit of an aircraft in general and, more particularly, to the drainage mast of the compartment of an Auxiliary Power Unit of an aircraft.

BACKGROUND OF THE INVENTION

Known drainage systems of the auxiliary power unit (APU) of an aircraft comprise a mast for evacuating any liquid accumulated in the APU compartment to the atmosphere by gravity.

One of the effects of the ventilation of the APU compartment typically induced by a jet pump mechanism generated by the APU itself is a depression (less pressure in the APU compartment than outside) generated in the APU compartment.

Some of the drawbacks of a pressure impact in the drainage system are mainly related to the difficulties in priming the drainage mast. That is, the draining capacity of the mast is sufficient once it is working fully filled with liquid, but if the ingestion of air into the APU compartment starts before the mast is filled with liquid, because there is a lower pressure in the APU compartment than outside, the stresses induced by the air flow impede the flow of liquid, and it may well happen that the mast never gets filled or primed. Rather, typically, air entering the APU compartment almost completely prevents any outflow of liquid until the liquid height inside the APU compartment is enough to balance the suction in the APU compartment, rendering the mast ineffective. Once this height is reached, only a reduced cross section of the mast will be useful for draining and, in addition, the liquid height in the APU compartment will be as large as what would be reached without a drainage mast.

U.S. Pat. No. 5,996,938 proposes a drainage system comprising a drain tube which is in fluid communication at its upper end with a liquid collecting floor and at its lower end to a check valve selectively open and placed as closely as possible to the aircraft overboard drain port. Liquids collected by the collecting floor are gravitationally directed into the drain tube upper end. The check valve is configured to be open to fluid drainage from the tube out of the drain port when the pressure head of fluid upstream of the check valve exceeds fluid pressure at the drain port due to aircraft operating conditions. This drainage system is therefore dependent of the said check-valve.

SUMMARY OF THE INVENTION

An object of the present invention is to provide a drainage mast capable of draining an APU compartment of an aircraft both when the pressure inside the APU compartment is higher than the pressure outside the APU compartment and when the pressure outside the APU compartment is higher than the pressure inside the APU compartment without any active pressure control device.

In one aspect, this and another objects are met by a drainage mast with a first end connected to the APU compartment and a second end for discharging the liquids to the atmosphere; the drainage mast being configured with at least a sector having decreasing cross section areas towards the second end; the area of the initial cross section of said sector being smaller than the area of any cross section of the drainage mast closer to the first end.

Said sector may be the whole drainage mast, a sector located in the second half of the drainage mast or an outlet sector at the end of the drainage mast.

In an embodiment in which said sector is the outlet sector and the drainage mast is arranged at an acute angle with respect to a horizontal plane at the first end, the outlet sector comprises an inner obstruction on the lower wall that completely obstructs a fraction of the cross sections along the outlet sector. The performance and operational characteristics of a drainage mast according to this embodiment are a function of the ratio between the areas of the final and the initial cross section of the outlet sector.

Advantageously, said ratio is comprised between 0.5-0.8.

In an embodiment in which said sector is the outlet sector and the drainage mast is arranged at an acute angle with respect to a horizontal plane at the first end, the outlet sector comprises an inner obstruction that divides the outlet sector into an upper outlet sub-sector, right below the upper wall, and a lower outlet sub-sector, right above the lower wall. The performance and operational characteristics of a drainage mast according to this embodiment are a function of the ratio between the areas of the final and initial cross section of the upper outlet sub-sector and the lower outlet sub-sector.

Advantageously, said ratio is comprised between 0.2-0.4.

Advantageously, said inner obstruction has a conical shape and is arranged with its base in a central position at the exit cross section of the outlet sector on the second end.

In an embodiment in which said sector is the outlet sector, the outlet sector is configured with a nozzle streamlined shape so that the streamlines of the liquid in the second end are very closely parallel to the axis of the drainage mast. The performance and operational characteristics of a drainage mast configured as a nozzle according to this embodiment are a function of the ratios between the effective diameters and areas of the final and the initial cross section of the nozzle.

Advantageously, said nozzle has a dome-ended rectangular shape or an oval shape at the second end and said ratios are comprised respectively between 0.8-0.90 and 0.6-0.8.

In another aspect, the above-mentioned object is met by an aircraft comprising a drainage mast with the above-mentioned features.

Other desirable features and characteristics of the invention will become apparent from the subsequent detailed description of the invention and the appended claims, in relation with the enclosed drawings.

BRIEF DESCRIPTION OF THE DRAWINGS

FIG. 1 is a schematic side view of a known drainage system of an APU compartment of an aircraft.

FIG. 2 is a schematic side view of a drainage system of an APU compartment of an aircraft according to a first embodiment of the invention and FIG. 2a is an enlarged frontal view of the outlet sector of the drainage mast.

FIGS. 3a and 3b are schematic side views of two situations of the drainage system of an APU compartment of an aircraft according to the first embodiment of the invention when the atmospheric pressure is higher than the pressure inside the APU compartment.

FIG. 4 is a schematic side view of a drainage system of an APU compartment of an aircraft according to a second embodiment of the invention and FIG. 4a is an enlarged frontal view of the outlet sector of the drainage mast.

FIGS. 5a and 5b are schematic side views of two situations of the drainage system of an APU compartment of an aircraft according to the second embodiment of the invention when the atmospheric pressure is higher than the pressure inside the APU compartment.

FIG. 6 is a perspective view of the outlet sector of a drainage mast of APU compartment of an aircraft configured as a nozzle. FIG. 7a is a rear view of the nozzle and FIGS. 7b and 7c are frontal views of two embodiments of the nozzle.

DETAILED DESCRIPTION OF THE INVENTION

Figure 8:
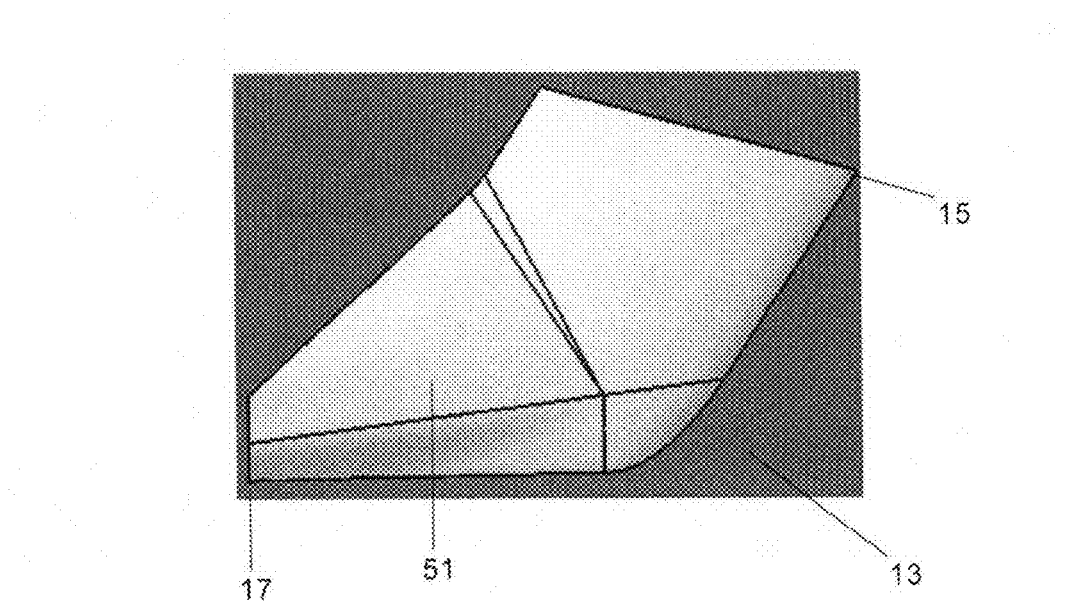
FIGS. 8 and 9 are side views of two drainage masts of an APU compartment according to other embodiments of the invention.

FIG. 1 illustrates the basic components of a known drainage system of an APU compartment 11 of an aircraft where liquids, those designated as flammable included, are accumulated: a drainage mast 13 with a first end 15 connected to the APU compartment 11 and with a second end 17 for discharging said liquids to the atmosphere. The APU compartment 11 is usually located in the tail cone of the aircraft close to the fuselage 9 and receives the liquids leaked by the APU 10.

In other configurations the lower wall of the APU compartment is in itself the fuselage skin.

As shown in FIG. 1, the drainage mast 13 is usually arranged at an acute angle α with respect to the fuselage 9 in the airflow direction (arrow F).

The length L of the drainage mast 13 and the inclination angle α with respect to a hypothetical horizontal plane at the first end 15 controls the effective height Heff of the liquid in the APU compartment 11 according to the equation:

$$\rho g\, Heff = \rho g (Ho + L \sin(\alpha)) = Pout - Pin$$

where:
ρ: liquid density at ambient conditions;
g: gravity acceleration;
Heff: liquid height in the APU compartment 11 measured from the second end 17 of the drainage mast 13;
Pout: pressure outside of the APU compartment 11 (atmospheric pressure);
Pin: pressure inside of the APU compartment 11.

On the other hand, Ho is the liquid height in the APU compartment 11 measured from the first end 15 of the drainage mast 13.

The basic idea of the present invention for priming the drainage mast 13 when there is a lower pressure in the APU compartment 11 than outside is configuring a sector of the drainage mast 13 with decreasing cross section areas compared to the cross section areas found upstream along the drainage mast 13. The reason for this is that the flow rate supported by the drainage mast 13 upstream of said sector will then be larger than what said sector can accommodate and, as a result, liquid will be accumulated along the drainage mast 13 upstream of said sector, therefore priming it.

Therefore when Pout>Pin, the drainage mast 13 will get primed when Heff is large enough to compensate the pressure difference.

We will now describe several embodiments of the present invention in reference to Figures showing the aircraft fuselage as the lower wall of the APU compartment 11 but the invention also comprises embodiments with a separate APU compartment 11 such as in FIG. 1. We will refer to a drainage mast 13 configured as a tube.

FIGS. 2, 2a, 3a, 3b show an embodiment of the invention where the sector of the drainage mast 13 with decreasing cross section areas, compared to the cross section areas found upstream along the drainage mast 13, is the outlet sector 21 and where said decreasing areas are implemented by means of a non-streamlined inner obstacle 31 on the lower wall 21 of the outlet sector 21 completely obstructing a fraction of the flow area of the cross sections right above the lower wall 20. If Pout>Pin the air flow entering the drainage mast 13 towards the APU compartment 11 (arrow F1) separates behind the obstacle 31 so a recirculation liquid bubble 32 is formed. As a result, liquid falling along the lower wall 16 of the drainage mast 13 gets trapped there. This liquid, in turn, makes the effective length of the obstacle longer so the length of recirculation also grows and so on. The result is that the effective cross section of the drainage mast 13 available for the inflow of air is of the order of the non-obstructed exit cross section left by the obstacle 31.

Once this channel for the air flow is set about working the liquid will fill the rest of the cross section of the drainage mast 13 (see FIG. 3a). Heff then reaches a high enough level to overcome the obstacle 31 and start draining the APU compartment 11 if there were no air inflow. However the pressure forces due to the air inflow still prevent the liquid from spilling over the obstacle 31. It is the growth of Heff which eventually provides a level enough to overcome these pressure forces and finally prevents the air inflow. At this moment, the drainage mast 13 priming is complete and the drainage system starts to work at its full capacity (see FIG. 3b) discharging liquid to the atmosphere through the whole available flow area (arrow F2) of the second end 17 (the exit cross section). Clearly, the height Heff of the liquid reached when the system begins to drain is lower than with a drainage mast 13 without the obstacle 31 because in the first case Heff includes the equivalent height of the drainage mast 13, L sin(α), reducing this way the height Ho inside the APU compartment 11.

When Pout>Pin the reduced area of the outlet sector 21 involves a reduction of the draining effectiveness.

FIGS. 4, 4a, 5a, 5b show an embodiment of the invention where the drainage mast 13 comprises an inner obstacle 33 in its outlet sector 21 dividing it into an upper outlet sub-sector 41 and a lower outlet sub-sector 43. With this configuration two effects are achieved. On the one hand a condition of liquid outflow is obtained well before the drainage mast 13 gets primed. This is so because once the lower part of the drainage mast 13 gets filled with liquid it flows out through the lower outlet sub-sector 43 (arrow F2), which is now open (see FIG. 5a) in contrast with the previous embodiment. On the other hand, the increased free flow area allows a better performance during the discharge without suction, leading therefore to smaller hydraulic diameters of the drainage mast 13 for the same drainage capacity.

The dynamics of the drainage mast 13 according to this embodiment is somewhat more complex than that of the previous embodiment and that of the bare drainage mast. The complexity arises due to the possibility of two modes of operation, namely the partially-primed mode and the fully-primed one.

The last one is the mode in which the whole section of the drainage mast 13 is draining liquid (see FIG. 5b). This mode provides the maximum draining capacity of the mast for a given effective height Heff of the liquid at the APU compartment 11.

In the partially-primed mode only the lower outlet sub-sector 43 is discharging liquid (see FIG. 5a). The air (arrow F1) is not prevented from entering the APU compartment 11 but it only flows through roughly the upper half section of the drainage mast 13, the lower half-section being filled with liquid flow (arrow F2) out of the APU compartment 11.

The general evolution when Pout>Pin is as follows. At the beginning, when no fluid is present in the drainage mast 13, the air flow enters through both the upper outlet sub-sector 41 and the lower outlet sub-sector 43. When the liquid leakage inside the compartment starts, the height of the liquid in the APU compartment 11 begins to grow because there is no liquid outflow through the drainage mast 13.

However, when the height Ho of the liquid at the APU compartment 11 reaches a few centimeters above the first end 15 of the drainage mast 13, the air is prevented from flowing upstream the drainage mast 13 through the lower outlet sub-sector 43, so a channel of liquid is established which pours out liquid continuously, although the drainage mast is not yet fully-primed, that is, there is still ingestion of air. This outflow is low because of both the reduced height and the reduced area of the exit cross section of the lower outlet sub-sector 43. However, it is effective in keeping low the level Ho of the liquid in the APU compartment 11 for low leakage rates, despite the ingestion of air. For larger leakage flow rates, the liquid level in the APU compartment 11 keeps on growing, although with a slower rate than at the start of the system. When the height Ho of the liquid reaches the level needed for balancing the suction Pout–Pin, the drainage mast 13 becomes fully-primed. Then, the drainage flow rate from the APU compartment 11 through the drainage mast 13 increases significantly. Now two possibilities arise according to whether the drainage flow rate in the fully-primed mode is larger or smaller than the liquid leakage flow rate. If the leakage flow rate is larger than the drainage one in the fully-primed mode, the height Ho of the liquid will keep on increasing. Since the drainage flow rate is proportional to the height, the liquid level Ho will increase until the drainage flow rate balances the leakage finally reaching a steady state with no ingestion of air. On the other hand, if the drainage flow rate in the fully-primed mode is larger than the leakage one, then once the mast becomes fully-primed the liquid level Ho will start to decrease until the ingestion of air F1 sets in again through the upper outlet sub-sector 41. The drainage mast 13 turns then back again to operate in the partially-primed mode, that is, with only the lower outlet sub-sector 43 pouring out liquid. The drainage flow rate is reduced, so if the new one is larger than the leakage one, the liquid level Ho begins to increase once again until the mast succeeds to get fully-primed and the cycle repeats once and again.

FIG. 6 shows an embodiment where the outlet sector 21 of the drainage mast 13 is configured as a streamlined nozzle with a progressive reduced cross-section area from its beginning of a circular shape to its end of a flattened shape.

FIGS. 7b and 7c show two examples of the final cross section of a nozzle having respectively a dome-ended rectangular shape and an oval shape. The initial cross section in both cases would be the circular section shown in FIG. 7a.

In one embodiment, the effective diameter De of the final cross section of the nozzle (De=$(4 \times A/\pi)^{1/2}$, being A the area of the final cross section) is comprised between the 80-90% of the diameter D of the initial circular section and the area of the final cross section is comprised between the 60-80% of the area of the initial circular section.

This embodiment provides better discharge times than the above-mentioned embodiments for a given discharge area in the outlet sector 21.

FIG. 8 shows an embodiment of the drainage mast 13 configured with an elbow shape where the sector with decreasing cross section areas is the end branch 51.

Figure 9:
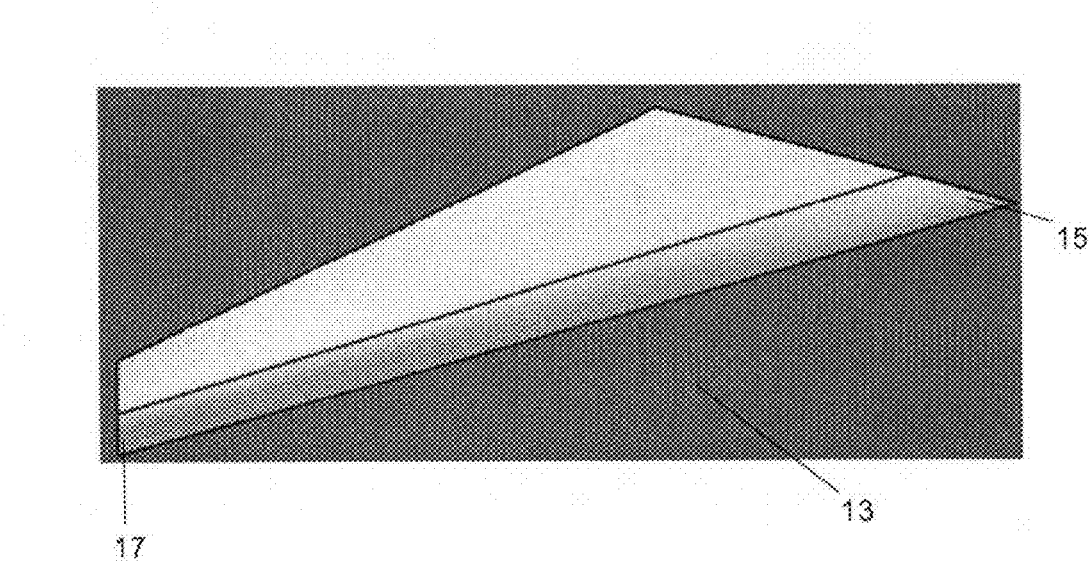

FIG. 9 shows an embodiment where the whole drainage mast 13 is configured with decreasing cross section areas from the first end 15 to the second end 17.

Although the present invention has been described in connection with various embodiments, it will be appreciated from the specification that various combinations of elements, variations or improvements therein may be made, and are within the scope of the invention.

The invention claimed is:

1. A drainage mast for draining liquids from an Auxiliary Power Unit (APU) compartment of an aircraft, the drainage mast comprising:
    a first end connected to the APU compartment, and
    a second end that discharges the liquids to atmosphere,
    the drainage mast being a tube extending from the first end to the second end, the liquids flowing in an interior portion of the drainage mast,
    the drainage mast including an outlet sector having decreasing cross section areas towards the second end and an area of the interior portion at an initial cross section of the outlet sector being less than an area of the interior portion at any cross section of the drainage mast closer to the first end,
    the drainage mast being configured to drain the liquids from the APU compartment where the APU has a pressure that is less than an atmospheric pressure outside the APU compartment and outside the drainage mast,
    wherein a ratio between an effective diameter of the interior portion at a final cross section and a diameter of the interior portion at the initial cross section of the outlet sector is between 0.8-0.9, and
    wherein the outlet sector is further comprised of a nozzle with a streamline shape so that streamlines of the liquid in the second end are very closely parallel to an axis of the drainage mast.

2. The drainage mast according to claim 1, wherein all of the drainage mast has a decreasing cross section area towards the second end.

3. The drainage mast according to claim 1, wherein the drainage mast is configured with an elbow shape in an airflow direction and wherein said sector is an end branch.

4. The drainage mast according to claim 1, wherein the drainage mast is arranged at an acute angle with respect to a horizontal plane at said first end in an airflow direction.

5. The drainage mast according to claim 4, wherein said outlet sector comprises an inner obstruction.

6. The drainage mast according to claim 5, wherein the inner obstruction completely obstructs a fraction of the cross sections along a lower wall of the outlet sector.

7. A drainage mast for draining liquids from an Auxiliary Power Unit (APU) compartment of an aircraft, the drainage mast comprising:
    a first end connected to the APU compartment, and
    a second end that discharges the liquids to atmosphere,
    the drainage mast being a tube extending from the first end to the second end, the liquids flowing in an interior portion of the drainage mast,
    the drainage mast including an outlet sector having decreasing cross section areas towards the second end, an area of the interior portion at an initial cross section of the sector being less than an area of the interior portion at any cross section of the drainage mast closer to the first end,
    wherein the drainage mast is configured to drain the liquids from the APU compartment where the APU has a pressure that is less than an atmospheric pressure outside the APU compartment and outside the drainage mast, and wherein the outlet sector is further comprised of a nozzle having streamline shape so that streamlines of the liquid in the second end are very closely parallel to an axis of the drainage mast.

8. The drainage mast according to claim 5, wherein the inner obstruction divides the outlet sector into an upper outlet sub-sector, right below an upper wall of the outlet sector, and a lower outlet sub-sector, right above a lower wall of the outlet sector.

9. The drainage mast according to claim 8, wherein a ratio between the areas of a final and the initial cross section of the upper outlet sub-sector and the lower outlet sub-sector is comprised between 0.2-0.4.

10. The drainage mast according to claim 9, wherein said inner obstruction has a conical shape and is arranged with a base in a central position of the outlet sector on the second end.

11. The drainage mast according to claim 7, wherein a ratio between areas of a final and the initial cross section of the outlet sector is comprised between 0.5-0.8.

12. The drainage mast according to claim 7, wherein the outlet sector nozzle has a dome-ended rectangular shape at the second end or an oval shape at the second end.

13. An aircraft comprising a drainage mast, according to any of claims 1-12.

14. The drainage mast according to claim 5, wherein the interior portion includes a surface on which the liquid at least partially flows and the surface at least partially defined the area of the interior portion at the initial cross-section of the sector.

15. The drainage mast according to claim 12, wherein a ratio between the areas of the interior portion at a final cross-section of the sector and the initial cross-section of the sector is between 0.6-0.8 where the nozzle has an oval shape at the second end.

16. The drainage mast according to claim 12, wherein a ratio between the areas of the interior portion at a final cross section of the sector and the initial cross section of the outlet sector is between 0.8-0.9 where the nozzle has a dome-ended rectangular shape at the second end.

* * * * *